(12) United States Patent
Impink, Jr.

(10) Patent No.: US 6,211,880 B1
(45) Date of Patent: Apr. 3, 2001

(54) DISPLAY APPARATUS

(76) Inventor: Albert Joseph Impink, Jr., Box 288 Rehoboth Bay Community, Rehoboth Beach, DE (US) 19971

(*) Notice: Subject to any disclaimer, the term of this patent is extended or adjusted under 35 U.S.C. 154(b) by 0 days.

(21) Appl. No.: 09/059,154

(22) Filed: Apr. 13, 1998

(51) Int. Cl.[7] .................................................. G06T 15/00
(52) U.S. Cl. ........................................... 345/418; 345/440
(58) Field of Search .................................... 345/418, 419, 345/420, 422, 423, 433, 440, 441

(56) References Cited

U.S. PATENT DOCUMENTS

| 4,674,044 | 6/1987 | Kalmus et al. . |
| 4,774,049 | 9/1988 | Impink, Jr. et al. ................. 376/245 |
| 4,816,208 | 3/1989 | Woods et al. . |
| 5,297,032 | 3/1994 | Trojan et al. . |

FOREIGN PATENT DOCUMENTS

| 2306283 | 4/1997 | (GB) . |
| 08263559 | 10/1996 | (JP) . |
| 09044568 | 2/1997 | (JP) . |
| 09293099 | 11/1997 | (JP) . |

OTHER PUBLICATIONS

"Interpolation Using Surface Splines", R. Harder and R. Desmarais, Journal of Aerospace Engineer, Engineering Notes, pp. 189–191, Feb., 1972.

Yahoo! Finace. Examples of Creating A Portfolio. pp. 1–5.*

* cited by examiner

Primary Examiner—Cliff N. Vo
(74) Attorney, Agent, or Firm—Daniel C. Abeles; Eckert Seamans Cherin & Mellott, LLC

(57) ABSTRACT

A display for presenting trends in financial commodities such as stocks. The display is made up of an array of rectangular boxes each representing an individual stock. Each display is dedicated to a different sector of the market. The color of the individual boxes is representative of the degree of fractional deviation of the most recent trading price of that stock from an assigned selected reference value, e.g., the price at the end of the previous trading session. Preferably, the location of each individual stock within the display is determined by the degree of influence that the user is to perceive that stock has upon one characteristic of the market, e.g., the volatility on one axis and perceived source of volatility on another axis, or the stocks can be located in accordance with decreasing market share on one axis and decreasing capitalization on the other. The result is a color display in which the current behavior of stock prices with respect to a selective set of reference stock prices in a selected sector of the economy is summarized in a checkerboard-like collection of visual boxes whose individual colors show the current trend in trading prices. The overall display shows sector trends and those individual stocks deviating from those trends. The individual boxes can also be designed to show trend information about the stocks that they respectively represent.

44 Claims, 4 Drawing Sheets

DISPLAY APPARATUS

BACKGROUND OF THE INVENTION

1. Field of the Invention

This invention relates in general to display apparatus presenting a comparison of analogous components not linked by a definable physical relationship from which one component could be extrapolated from another, and more particularly to apparatus for displaying trends in a process related to financial markets, having a number of analogous components each having a corresponding, variable element.

2. Background Information

The trading of financial instruments such as stocks and bonds has largely become a computer supported operation. Almost all significant trading of securities is accomplished by computer pursuant to the established protocols of the major exchanges. For example, on the New York Stock Exchange, orders for specific securities are entered at a terminal operated by a licensed agent with a "seat" on the exchange. This order is processed through a stock "specialist", a firm that is obligated to manage transactions for a given security. The specialist clears the stock trade at a price reflecting the current supply-demand environment for that security. Upon confirmation of the trade, the parties up-date their respective positions via computer controlled memory. For the most part, the above transaction is accomplished through computer terminals linked together by communication buses or telephone lines.

A different arrangement is provided for certain over the counter trading associations of which NASDAQ "National Association of Securities Dealers" is probably the most prominent. These exchanges avoid the use of specialists in specific stocks and membership does not invoke a seat on an exchange. To the contrary, NASDAQ is established as a computer integrated market of select securities, wherein members trade as agents for their customers and make markets in specific securities themselves. To operate effectively in this environment the members must have a sophisticated communication system that permits entry and up-dating of current stock positions supporting the desired transactions. This invokes the creation and operation of a central on-line database for the securities to be transacted. Members enter into the NASDAQ database via a remote terminal and input their request as more fully described in U.S. Pat. No. 5,297,032 issued Mar. 22, 1994.

These operations are heavily dependent on appropriately programmed computer systems, for example, see U.S. Pat. No. 4,674,044 to Kalmus et al., titled "Automated Securities Trading System". In addition to supporting such transactions, dealers also participate in making markets in individual securities, i.e., the dealer is also the principal and sells the securities out of dealer inventory.

The above operations are performed in real time with the participation of hundreds of competing buyers and sellers forming a highly competitive environment. A central element to success in such a market is the rapid access to vital information on current market conditions in terms of market trends and recent swings to support the ability to enter quickly to establish or withdraw a price. For example, a trend away from a given security is first indicated by a drop of market makers on the inside market. Participants with an early indication of the soaring market are in the best position to profit from it, "or reduce their exposure".

This process has become more complicated with customers communicating with their traders on-line directly through the use of personal computers. In order for such customers to maximize the benefits of their trades it is imperative that they have the ability to assimilate the vital information available on current market conditions in real time. Many of those customers are substantially less sophisticated than their traders and need to have that information presented in a user friendly manner that they can readily adsorb, understand and apply.

In the past, the traders were largely dependent on information supplied directly from the database of transactions in a form selected primarily for ease of communication. Although the on-line data was rich with current market information, the form of this data simply was not optimized to permit rapid extraction and review to support trading; to the contrary, the feed data was mostly devoid of trend information in the market and the traders had to mostly rely on intuition and luck in predicting market shifts.

U.S. Pat. No. 5,297,032, cited above, addressed this issue by providing a multi-tasking workstation that includes seven primary applications each of which is set in a windowed interface for implementing a plurality of security based transactional operations. While the invention provided more information, including trends, to the operators, it presented a different problem in contributing to information overload and the lack of ease of assimilation of the information. The depth of this problem is described more fully in U.S. Pat. No. 4,816,208, entitled "Alarm Management System", issued Mar. 28, 1989. Accordingly, it is an objective of this invention to establish a display format which will communicate multiple facets of information about the markets in a form that is easily absorbed and readily understood. More particularly, it is an object of this invention to provide such a display for identifying trends that is applicable to a number of processes having a plurality of analogous components with a common variable element.

SUMMARY OF THE INVENTION

It is an object of this invention to provide a display for identifying trends in a process including a number of analogous components each having at least one corresponding, variable element that enables a display operator to readily assimilate and easily understand the trends and the corresponding information from which they are generated. In this regard, a plurality of complementary geometrically shaped fields, e.g., rectangles, each representative of the corresponding, variable element of one of the components, are displayed side by side in a graphical array. A visual pattern within each field is varied according to a common code which incrementally changes between two extremes; the displayed pattern corresponding to the last measured variation of the variable element from an intermediate reference value. The reference value is the measured empirical value of the corresponding variable element for each component chosen at a predetermined, common point in time and the extremes are common preselected deviations.

In a preferred embodiment the invention is directed to determining trends in financial markets and more particularly in stock markets. The display is rectangular with boxes within the display each representing an individual stock. Each display is dedicated to a different sector of the market. The color of the individual boxes is representative of the degree of fractional deviation of the most recent trading price of that stock from an assigned selected reference value, e.g., the price at the end of the previous trading session or the beginning of the current week, month or year. Preferably, the location of an individual stock within the display is determined by its volatility in the market, e.g., apparent sensitivity to broad changes in the market on one axis and apparent sensitivity to changes external to the market on the other axis, or stocks can be located in accordance with decreasing market share on one axis and decreasing capitalization on the other.

In the foregoing embodiment, the fractional deviation values for the various stocks are translated into colors for presentation on the display. The result is a color display in which current behavior of stock prices with respect to a selected set of reference stock prices in a selected sector of the economy is summarized in a checkerboard-like collection of visual boxes whose individual colors show the current trends in trading prices of the corresponding stock. Broad shifts or trends in stock prices in the sector appear as broad areas of a single color or of adjacent colors. The deviation of individual stocks from the trend can also be observed. With the position of the representations of individual stocks ordered as set forth above, the upper left corner of the display is most representative of the trend of the sector since the most influential stocks are located there.

A modification of this general pattern could be implemented in accordance with this invention in the special case in which trading in one or more stocks on a given stock exchange is halted by that exchange in response to the development of abnormal conditions relating to that stock or those stocks. In this special case the box/block corresponding to each affected stock would be assigned a unique color lying outside the set of colors normally used to indicate degrees of fractional deviation of current trading prices from reference values.

In another embodiment of the invention, a smoothing algorithm is applied to the raw fractional deviation values. This results in a smoothened display which emphasizes the overall trend of the sector. In another enhancement each box representative of a stock is broken down into a plurality of fields from which a change in the trend of the individual stocks or other market components over a preselected time period can be observed. The invention can be applied to other financial markets as well such as the currency markets.

BRIEF DESCRIPTION OF THE DRAWINGS

The foregoing features will be more fully appreciated in view of an illustrative example thereof taken in conjunction with the accompanying figures of which.

DESCRIPTION OF THE PREFERRED EMBODIMENTS

The present invention is directed to display generation apparatus for displaying to a user a comprehensive indication of ongoing changes and trends in a process having analogous components with varying corresponding elements. Each component is represented by a field in an array with the status of the element for each component relative to a reference value shown by a color code in the corresponding field, with the variation in colors across the display identifying trends.

The invention can be better understood when viewed in a particular application to the financial markets and in particular, in one preferred embodiment, to stock markets. The invention in such an application comprises a display generation apparatus for portraying to a user a comprehensive indication of ongoing changes and trends in trading prices of a number of individual corporate stocks such as are traded on a recognized stock exchange, e.g., the New York Stock Exchange. The invention further provides a display for translating information relating to the most recent trading prices of such stocks as determined from a currently available, on-line data source, such as described in U.S. Pat. No. 5,297,032, into coded colors displayed by individual pixels on the electronic output screen of the display apparatus.

Desirably, the set of stocks whose trading price fluctuations are depicted in a specific display is selected to be representative of a particular sector of the national economy. Thus, one such display might be indicative of the trends in trading prices of stocks issued by corporations active primarily in the "services" sector. Another display of the same basic arrangement can represent trends in trading prices of stocks of companies involved primarily in the "energy" sector, etc. It is expected that the total number of displays, corresponding, respectively, to the several sectors of the economy as defined in a given stock exchange will be about twelve, though that should not be considered a limitation of this invention.

While the fully expanded implementation of the invention is envisioned to treat, effectively in parallel, all of the identified sectors of the economy as perceived in a specific stock exchange, for purposes of simplification the processing of stock transaction information in a single sector is described here. Generalization to parallel processing of information relevant to more than one sector is straightforward. However, certain display aspects of a multi-sector parallel processor will be noted in the following description.

Figure 1:
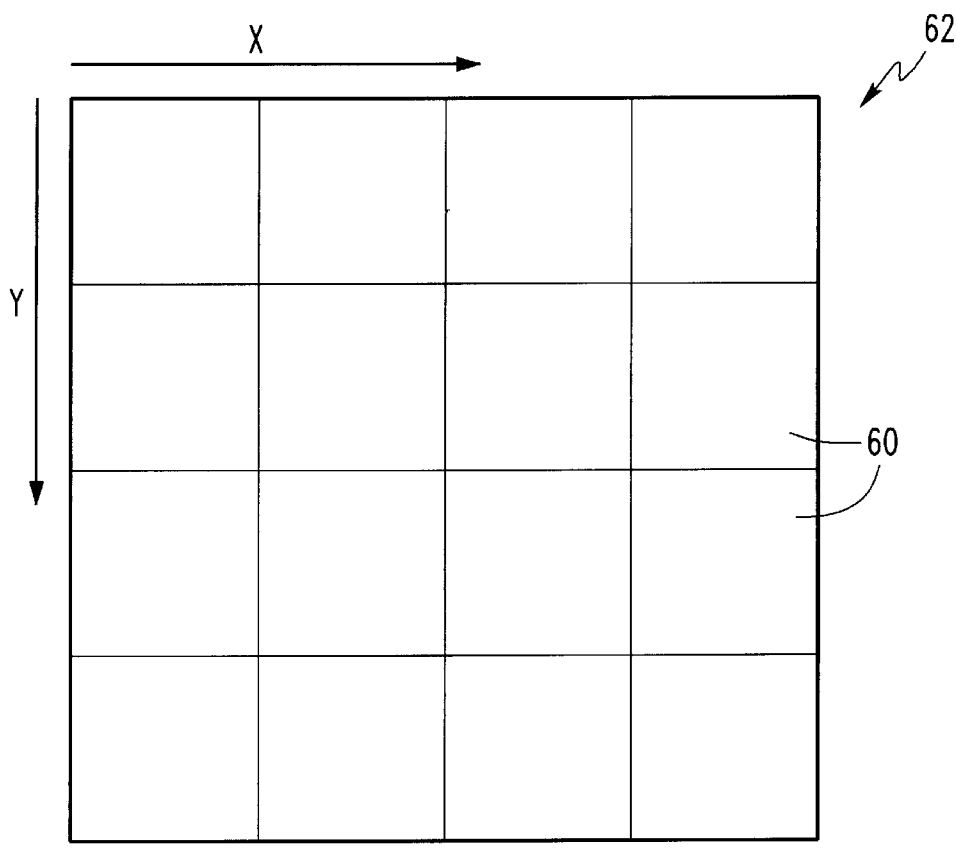
FIG. 1 is an illustration of how stocks of various companies can be organized within the graphical display of this invention.

As shown in FIG. 1, the basic display arrangement 62 for a given sector consists of a square or rectangular array of "boxes" 60 of square or rectangular form arranged in a regular row and column configuration. Each "box" area or field 60 consists of a number of addressable pixels, also arranged in rows and columns, on the output display screen and corresponds to a specified stock in the sector of interest. Though not shown in FIG. 1, the field/stock correspondence for each box is shown within the area of the box by an alphabetic indication of the name of the corporation issuing the stock. The alphabetic indication should be a contrasting color to enhance readability. Alternatively, it is possible by means of a mouse, touch screen, or light pen for a user to call up the name of the issuing corporation together with details of the past performance for example, on request.

The color of the area on the display screen enclosed by each box 60 is representative, by a programmed code, of the degree of fractional deviation of the most recent trading price of the corresponding stock from an assigned, selectable reference value of the trading price of that stock. The reference value of a trading price of a given stock could be, for example, the closing price of that stock at the end of the previous trading session or the opening price of that stock at the first trading session of the current week, month or year. Alternative reference values are also accommodated. However, to be meaningful the reference values of all considered stocks in the sector of interest must correspond to the same point in time.

The association of a given box 60 on the display 62 with a given stock in the corresponding sector is, in principle, arbitrary. However, several different association patterns can provide added meaning to the display, making trends more recognizable. In one, stocks are assigned to box locations in terms of "volatility" of the stock prices and of perceived sources of volatility. Thus, an overall arrangement of a typical sector display can be depicted as illustrated in FIG. 1 in which the left to right aspect of the display can be representative of increasing sensitivity to internal sector/market activity while the top to bottom aspect of the display is representative of increasing sensitivity to external activity. In this approach sensitivity to internal market activity can be measured in terms of the value of the "Beta" parameter quoted in reviews of the behavior of individual stocks. Beta is a parameter that identifies how volatile the stock is when compared to a particular index. More information about the Beta parameter as an estimate of risk can be found in a reference authored by Malkiel, entitled A Random Walk Down Wall Street. After reviewing that reference it will be appreciated that the horizontal aspect of FIG. 1 can readily represent "systematic risk" and the vertical aspect can represent "unsystematic risk" as such terms are defined in the reference.

Alternatively, the overall assignment of stocks to boxes 60 in a given sector display 62 can be in terms of total capitalization and market share. For example, the top to bottom aspect of FIG. 1 can be representative of decreasing market share while the left to right aspect is representative of decreasing capitalization. While the individual fields 60 for the respective stocks have been described as boxes, it should be appreciated that they can take on other geometric forms, e.g., triangles. Desirably the mating interfaces between fields should form a complementary design so that the transition from one to the other is smooth.

As a general rule, the most stable and most indicative stocks in a given sector should be assigned box locations in the upper left region of the display while stocks considered to be least indicative of overall sector behavior should be assigned box locations in the lower right regions. This methodology is in keeping with the "visual momentum" concept of cognitive psychologists.

In one preferred embodiment of the invention, the actual fractional deviations of the most recent trading prices of the stocks in the sector of interest from their corresponding reference values, in a selected set of reference values, are calculated using the expression:

$$\left.\frac{Fractional}{Deviation}\right|i = \frac{MostRecentTradingPrice|i - ReferenceTradingPrice|i}{ReferenceTradingPrice|i}$$

Where the subscript "i" identifies the particular stock. In principle, the value of the fractional deviation can range from $-1.0$ to $+\infty$. In realistic cases it is expected that the actual range would probably not exceed $-0.20$ to $+0.20$, corresponding to situations in which the particular stock is trading at 80 percent of its reference value and 120 percent of its reference value, respectively. The range will be, in general, dependant on the "age" of the reference value set. That is, the further in the past the reference value set was defined, the broader, on average, the range of fractional deviations will be.

Translation of the current fractional deviation values to pixel colors is done in a two stage process. In the first stage the entire expected range of fractional deviation values is divided into a set of subranges which may be, but need not be, of equal size. Considerations, based on the ability of the human eye to readily distinguish similar colors from each other, have shown that a set of, typically, eleven subranges, is desirable for best resolution. These subranges may then be identified by, for example, positive sequential integer numbers. Thus, for a relatively limited expected range of fractional deviation values spanning the interval minus 0.050 to plus 0.050, corresponding to most recent trading prices differing, in general, by no more than ± five percent from a selected recent reference set of trading prices, the subregions might be defined and identified as follows:

TABLE 1

| Fractional Deviation Value | Subregion Identifier |
| --- | --- |
| +0.045 to + | 11 |
| +0.035 to +0.045 | 10 |
| +0.025 to +0.035 | 9 |
| +0.015 to +0.025 | 8 |
| +0.005 to +0.015 | 7 |
| −0.005 to +0.005 | 6 |
| −0.015 to −0.005 | 5 |
| −0.025 to −0.015 | 4 |
| −0.035 to −0.025 | 3 |
| −0.045 to −0.035 | 2 |
| −1.000 to −0.045 | 1 |

Note that the subranges 1 and 11 effectively account for all outlying deviations. Occurrence of a significant number of fractional deviation values in the 1 and 11 subranges indicates that the expected range should be expanded and the subregion boundaries redefined. In this connection, automatic rescaling of the expected range can be done employing techniques well known in the art, based on the number or fraction of the fractional deviation values falling in the end subregions.

The set of integral values used to identify subregions will be recognized as having computational advantages. In this embodiment, the exact boundaries of each subregion must be specified. Thus, the bounds of the +9 range, for example, described above, could be set either as:

>0.025 fractional deviation, and

≦0.035 fractional deviation or as

≧0.025 fractional deviation, and

<0.035 fractional deviation

The choice between the two sets of rules is nominally arbitrary. However, which ever rule is adopted must encompass all possible values of fractional deviation and the rule must be consistently applied.

In the second stage of converting recent trading prices to colors the set of subregions is mapped onto a set of related display pixel colors. In the preferred embodiment the set of colors range from pure orange through colors of progressively lower red content and higher yellow content through a medium, pure yellow color and on by way of decreasing yellow content and increasing blue content to a final pure green. The pure orange color corresponds to the subregion encompassing the most negative fractional deviation values; the medium pure yellow color corresponds to the subregion of little or no fractional deviation, and the pure green color corresponds to the subregion of the most positive fractional deviation values. Following the example given above:

TABLE 2

| Subregion Identifier | Color |
| --- | --- |
| 11 | Green |
| 10 | ↑ |
| 9 | Increasing blue Decreasing yellow |
| 8 | |
| 7 | |
| 6 | Yellow |
| 5 | |
| 4 | Decreasing yellow Increasing red |
| 3 | |
| 2 | ↓ |
| 1 | Orange |

As an alternative to the use of rigid, precise boundaries for the respective subregions it is also possible to utilize "dead bands" as are well known in control theory art in order to suppress possible flutter in the subregion identifier values at successive time steps.

The net result is a color display on an electronic display device in which the current behavior of stock prices with respect to a select set of reference stock prices in a selected sector of the economy is summarized in a checkerboard-like collection of visual boxes whose individual colors show the current trends in trading prices of the corresponding stocks. Broad shifts or trends in stock prices in the sector appear as broad areas of a single color or of adjacent colors. Broad area shifts toward green, particularly in the upper left quadrant of the display, are indicative of potentially favorable conditions for investment in that sector. Area shifts toward orange particularly in the upper left quadrant, are indicative of declining prices. On the other hand, the appearance of a box of markedly different color than that of adjacent and nearby boxes will draw immediate attention to the particular stock associated with that box as departing from the general sector behavior. The quadrant in which the aberrant stock behavior is displayed can shed useful information regarding the significance of the abnormality. A further enhancement can be provided in the special case in which trading in one or more stocks on a given stock exchange is halted by that exchange in response to the development of abnormal conditions relating to that stock or those stocks. In this special case, the box/block corresponding to each affected stock would be assigned a unique color lying outside the set of colors normally used to indicate degrees of fractional deviation of current trading prices from reference values. In such a special case, of a stock for which trading has been halted, the preferred color in the box/block corresponding to that stock would be a pure red. While the foregoing selection of colors is preferred it should be appreciated that the invention will work with a number of different combinations of colors.

In a second preferred embodiment of the invention, the first stage of the process for translating current fractional deviational values to pixel colors is modified to apply a smoothing algorithm to the raw fractional deviation values in the sector under consideration. In this approach, the current set of fractional deviation values is processed through a surface spline fit in which allowance is made for so-called "elastic spring" values. For purposes of generating the surface spline fit the fractional deviation values of the respective stocks represented in the display are associated with the spacial points located at the geometric centers of the corresponding boxes, referred to as locations "i" below. The magnitude of the "elastic-spring" value which is assigned to each stock, and therefore to its current fractional deviation value, is indicative (inversely) of the importance of that stock's behavior in evaluating sector behavior. A description of the application of surface spline methodology to the generation of surface functions in situations in which specific values of the functions are known only at discrete points is to be found in "Interpolation Using Surface Splines" by Robert Harder and Robert Desmarais in the *Journal of Aircraft, Engineering Notes*, dated February, 1972, pages 189–191. The relevant equation is equation 17 in which the "elastic-spring" values are represented by the coefficients $C_i$. A coefficient value of zero, $$C_i = 0.0$$

sets the requirement that the fitting surface value at the location "i" must match exactly the value of the input at location "i". In the current application this means that the value of the fitting surface at the center location of the designated box must be exactly the value of the fractional deviation of the most recent trading price of the stock corresponding to the designated box. If the coefficient value of a different stock, i.e. the value at the central location for that stock, is assigned a value greater than zero, $$C_i > 0.0$$

the value of the fit at the central location of box "i" is allowed to differ, in the interest of obtaining a smoothened fit, from the actual measured fractional deviation value of the corresponding stock. Thus, by assigning small values of the coefficient "C" to boxes/stocks that tend to dominate the assessment of the behavior of the sector of interest and larger values of the coefficient to boxes/stocks that have lesser impact on assessment of sector behavior, there results a fit that has been "smoothened" and is more nearly indicative of overall sector behavior. The assigned values of the coefficient "C" are stored in the elastic spring constants library which is part of the surface spline fit calculator subsystem 56 of the display generating apparatus illustrated in FIG. 2, which will be described more fully hereafter. Values of the "smoothened" fractional deviations obtained by evaluating the surface spline fitting function at each box location are then processed through the second stage of the translation to colors and the color display is drawn. This second stage is processed by the subregion classifier 42 also shown in FIG. 2. The surface spline fitting function and its adaptation to various applications is well known and within the ordinary skill of the art.

It is to be noted that a comprehensive display of the behavior of the overall stock market, as reported by a specific stock exchange, can readily be generated by combining all of the individual sector displays as generated using this second embodiment provided all of the individual displays are based on reference value sets established at a common point in time and all utilize the same subregion boundary set or color code. The combined display would have the individual sector displays reduced, as necessary, in size and arranged in a row and column format. Since the fine detail of the individual displays has already been removed by surface spline fitting with elastic spring constants, shrinking in size of the individual displays should entail no further loss of detail.

The methods and apparatus described above can be applied to other areas of financial transactions such as the bond market and the currency exchange market, both domestic and foreign. It can further be applied to commodities markets and other analogous processes that have related components with corresponding variable elements.

Figure 2:
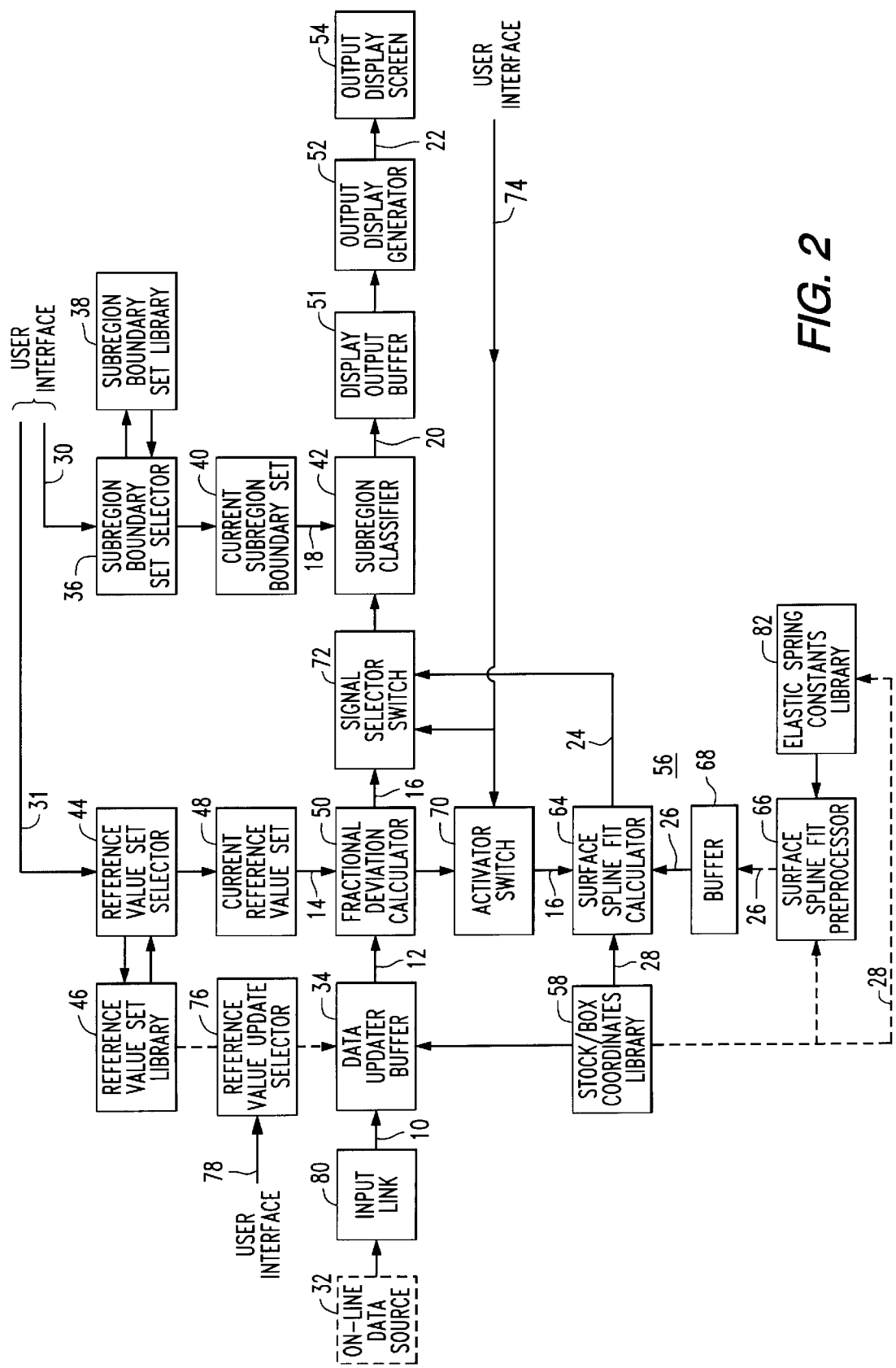
FIG. 2 is a block diagram of a system for generating the primary display of this invention.

FIG. 2 is a block diagram illustrating component portions of an apparatus that can be employed to generate a display in accordance with this invention. It is expected that the input link 80 will operate on a cycle time short enough that all transaction results that are carried by the on-line data source 32 will be captured by the input link 80 and passed to the updater buffer 34. Updating of the output display based on the current contents of the updater buffer 34 should occur approximately every thirty seconds, allowing time for the user to assimilate the information in the display before the display is updated again. The thirty seconds update criteria can be adjustable to accommodate the comfort of the user. It is desirable that the system be capable of shifting to a different reference value set and/or a different subregions boundary set within one, nominally thirty seconds update cycle through the corresponding user interfaces 31 and 30 illustrated in FIG. 2. Updating of some of the libraries and the surface spline fit invariants can be done off-line and should be required infrequently and can be provided as updates to the software package.

Referring to FIG. 2, the user can make a number of selections to define the display output through the user interfaces 30 and 31. User interface 30 selects the subregion boundary and implements the chosen pattern code, e.g., color code, to be employed to represent the fractional deviation for each field on the display as previously described. User interface 31 sets the reference value set to be employed. The reference value set selector 44 accepts the user's instructions from the interface 31, identifies the corresponding set of reference values in the library 46 and passes the selected set 14 for storage in the buffer 48 which provides a corresponding input to the fractional deviation calculator 50. Similarly, the subregion boundary set selector 36 retrieves the selected subregion boundary data from the library 38 in response to a user input 30 and stores the information in the buffer 40, which supplies a corresponding input 18 to the subregion classifier 42. The user also has the option to update the reference values to the then current stock prices in the updater buffer 34 by adding those prices to the reference value set library 46, through the user interface 78 and reference value update selector 76. These user inputs specify the operating parameters of the display system.

In operation, results of transactions 10, as they occur, are fed into the data updater buffer 34 which also receives inputs from the stock/box coordinates library 58. The coordinates library 58 establishes the relative location of fields within the display. The data updater buffer 34 communicates the most recent trading prices with their respective corresponding coordinates 12 to the fractional deviation calculator 50 which supplies the current fractional deviation values to the surface spline fitting calculator 64. The surface spline fitting calculator module 56, which is made up of the activation module 70, surface spline fitting calculator 64, buffer 68, surface spline fit preprocessor 66 and elastic spring constants library 82, also receives inputs from the stock/box coordinates library 58. The stock coordinates library 58 provides an input to both the surface spline fit preprocessor and the elastic spring constants library 82 to match the appropriate elastic spring constants to the corresponding coordinates via the surface spline fit preprocessor 66. The output of the surface spline fit preprocessor 66, indicated by reference character 26, is stored in a buffer 68 which supplies the appropriate value to the surface spline fit calculator 64. When the surface spline fit calculator module 56 is activated by the activation switch 70, through an input from the user interface 74, the fractional deviation calculator 50 supplies the current fractional deviation values 16 to the surface spline fit calculator 64 to perform the "smoothened" calculation along with inputs 28 from the stock/box coordinates library and 26 from the buffer 68. The "smoothened" fractional deviation values 24 are then inputted to the subregion classifier 42 through the subregion classifier selector switch 72. The fractional deviation calculator 50 also supplies the raw current fractional deviation values 16 to the subregion classifier 42 through the subregion classifier selector switch 72. The subregion classifier selector switch 72 selects one of the inputs 16 or 24, as directed by the user input 74, for display. The subregion classifier 42 generates the subregion identifier values 20 which are collected in the output buffer 51 prior to being inputted to the output display generator 52 which in turn provides the display commands 22 to the output display screen 54. In this way, the output display is generated as previously described. When the raw current fractional deviation values 16 are selected for display by the user input 74, through the subregion classifier selector switch 72, the surface spline function is inhibited by an input from the user interface 74 through the activation switch 70 and the surface spline fit calculator 64, which is quite computational resource intensive, is turned off.

The surface spline fit preprocessor 66 is used only to calculate a set of nominally invariant factors that are used by the surface spline fit calculator 64. The only times that the preprocessor 66 actually runs are when:

a. the location assigned to any stock in the display is changed to account, for example, for a perceived change in volatility, or a stock is added to or removed from the display; or b. the value of the elastic spring constant as assigned to a displayed stock is changed.

Otherwise the preprocessor 66 supplies a set of constants to the calculator which is stored in the buffer 68 to be drawn upon by the surface spline fit calculator 64 when in operation. Thus, when the preprocessor 66 operates, which normally would be quite infrequently, it stores its output in the buffer 68. Thereafter, when the calculator 64 runs, which is typically every 30 seconds, unless inhibited by a user command 74 to base the display on raw fractional deviation values, it would access the buffer 68 and use the stored constants. Alternatively, the preprocessor could be completely off-line, running on a different platform with communications between it and the calculator 64, e.g., by disk or equivalent.

It is desirable in some instances to couple the output display to a color printer. This would permit the user to obtain a hard copy print of the display on the screen, i.e., the sector trends at selected points in time. Alternatively, the most recent trading prices displayed and reference values can be stored on a hard drive or portable disk so the display can be regenerated for later review and comparison. Preferably the current reference value set identifier (date and time corresponding to the set) and the current subregion boundary-color mapping should appear on all output displays in a readily noticeable area to minimize user misinterpretation of the displays.

Figure 3:
FIG. 3 is an illustration of an alternate visual pattern code which can be employed in place of, or in combination with, the color code described in the context of the first described preferred embodiment.

Provision can also be made to substitute a set of simple geometric patterns for the colors in the respective boxes (or provide a combination of color and pattern) to allow color blind users to correctly interpret the information displayed on the output screen. An alternative set of patterns that can be used for this purpose is illustrated in FIG. 3. It should also be appreciated that the display generator described in U.S. Pat. No. 4,774,049, with regard to a power distribution deviation calculator for a nuclear reactor, can be adapted to implement many of the blocks illustrated in FIG. 2.

In another embodiment the basic methodology of the current invention relating to a financial data display system, can be applied with minor modifications to a display system for currency exchange transactions. Such an application can be enhanced by the following modifications to that previously described:

a. a modest generalization of the mathematical expression used to define fractional deviation, and b. a notational change in the actual graphical display as will be described hereafter.

The mathematical expression used to define the fractional deviation for this application is:

$$\text{fractional deviation}\Big|_{ij} = \frac{\left.\frac{\text{units of currency}_i \text{ sold}}{\text{units of currency}_j \text{ bought}}\right|_{\text{most recent transaction}} - \left.\frac{\text{units of currency}_i \text{ sold}}{\text{units of currency}_j \text{ bought}}\right|_{\text{reference ratio}}}{\left.\frac{\text{units of currency}_i \text{ sold}}{\text{units of currency}_j \text{ bought}}\right|_{\text{reference ratio}}}$$

where the "$i$" and "$j$" each refer to each currency of interest with the exception that, by definition, "$i$" does not equal "$j$".

By way of illustration, one can consider a currency exchange involving converting units of currency "X" into units of currency "Y". In this case "X" is the currency sold, designated by the "$i$", and "Y" is the currency bought, designated by "$j$." If the value of "Y" has risen against the value of "X" since the point in time at which the reference ratio was set, the current fraction deviation of the "X" to "Y" exchange will have a positive value. If one now considers the reverse transaction, converting "Y" to "X", one finds that "Y" is the currency sold, designated by "$i$", and "X" is the currency bought, designated by "$j$". If again, the value of "Y" has risen against the value of "X" since the reference was set, the current fractional deviation of the "Y" to the "X" transaction will have a negative value. Note that even though the two hypothetical transactions may have occurred simultaneously the absolute values of the respective fractional deviations would not be expected to be exactly equal due, in part, to the commission charge for each transaction, and, in part, due to the method used to normalize the two fractional deviation values. The effect of the cost of the transaction on the fractional deviation values decreases, typically, as the cost as a fraction of the whole value of the transaction decreases, i.e., the effect is less the larger the transaction. The effect of normalization decreases as the fractional changes in the relative currencies with respect to the reference decreases.

Figure 4:
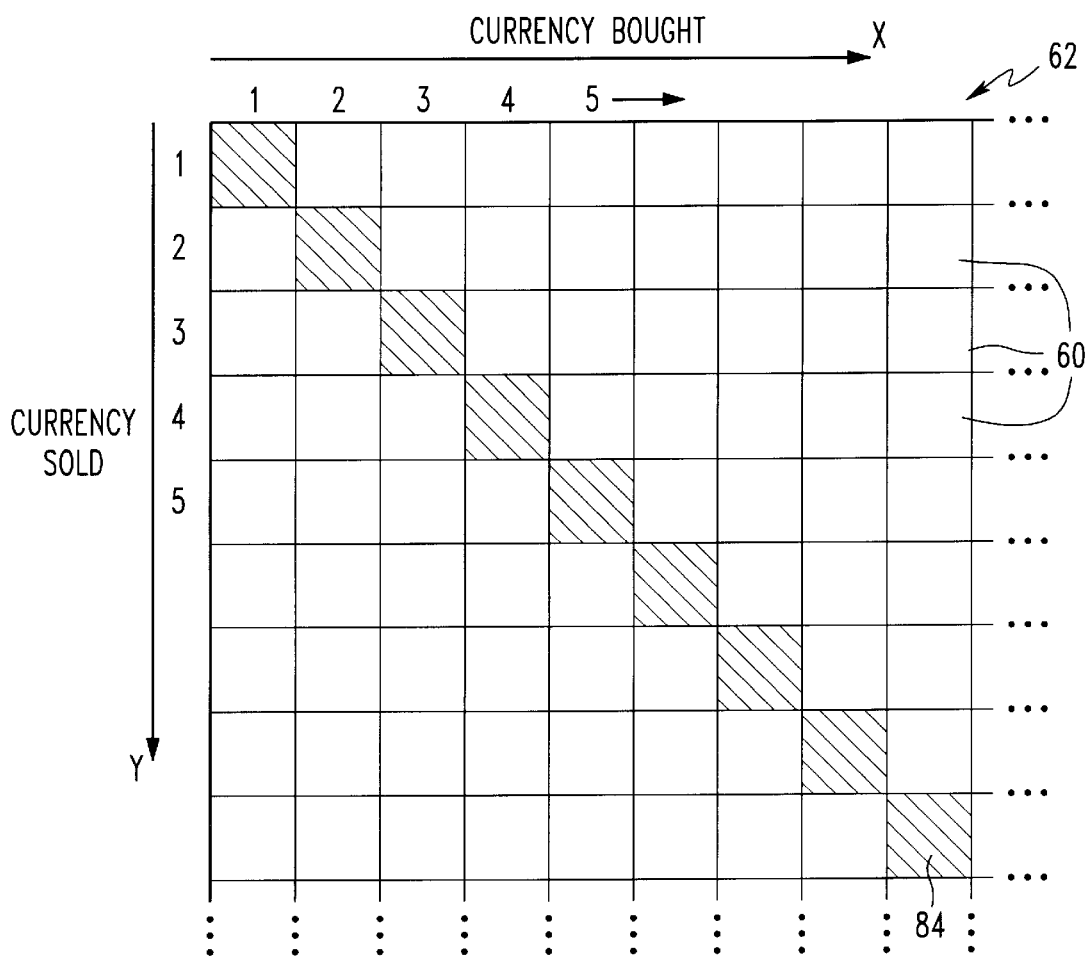
FIG. 4 is an illustration of how currency markets of various countries can be organized within the graphical display of this invention.

The graphical display summarizing trends in currency exchange transactions takes the form illustrated in FIG. 4, which is similar to the display appropriate to stock and bond transactions illustrated in FIG. 1. The "$i$", introduced above, becomes the row designator and the "$j$" becomes the column designator in the display array of this example, though, it should be appreciated that the reverse can apply equally as well.

In the arrangement illustrated in FIG. 4 currency 1 could be, for example, dollars; currency 2 pounds sterling; currency 3 deutsche marks; currency 4 yen; and so on. As previously described with respect to the stock related display, major world currencies which are presumed to be the most stable are assigned locations in the upper left hand region of the display. More volatile currencies would appear progressively further to the right and correspondingly further down in the array. The diagonal elements 84 of the array 62 are not meaningful in this application and could be colored black or grey, for example, to set them off from the rest of the display.

In application, a user who is speculating in currencies and has, for example, deutsche marks to exchange would enter the display from the left at the row corresponding to deutsche marks being sold and would search across the row for boxes/blocks 60 whose colors trend from yellow toward green. The currencies corresponding to the columns in which the "greenish" blocks or boxes appear are those whose values have risen against the deutsche mark since the reference was set. The degree of "greenness" of such a box or block 60 is a measure of the current relative strength of the corresponding currency with respect to the deutsche mark. On the supposition that the indicated trend will continue, it would be appropriate to exchange deutsche marks for the most "green" currency of acceptable volatility.

Continuing this line of reasoning, boxes or blocks 60 in the deutsche marks row with colors tending toward orange are seen to lie in columns corresponding to currencies whose values have fallen with respect to the deutsche mark since the reference was established. Again, on the supposition that the trend will continue, it would not be appropriate to exchange deutsche marks for such currencies. An observed shift in color in a box or block 60 from a weaker green to a stronger green is a clear indication that the apparent rising trend of the corresponding currency with respect to the deutsche mark is, in fact, continuing. The converse is also true.

The display for showing currency exchange transaction trends can also be implemented by the circuit shown in FIG. 2 where the stock/box coordinates library 58 is programmed to identify the cells 84 in a manner that would be recognized by the subregion classifier 42 and output display generator 52 so that the appropriate distinguishing coloring appears on the output display screen 54. Additionally, the fractional deviation calculator 50 would have to be programmed to perform the fractional deviation calculation previously described for application to currency exchange transactions. The other changes to the respective libraries and other components should be similarly obvious to one skilled in the art.

The further enhancement described below can be utilized in all described applications of the invention that do not make use of "smoothening" of a set of fractional deviation values by surface spline fitting or an equivalent method. "Smoothening" is only believed to be of substantial benefit when generating displays covering large portions of a total market and showing only large scale trends. The ability to obtain the fine detail and individual element performance that this enhancement would provide is of no practical consequence when "smoothening" is invoked.

While the current invention yields a reliable indication of a linearized trend of the variable element with respect to an earlier reference value, it does not provide a convenient means for detecting a change in trends except by continually visually monitoring the color of a box/block corresponding to a stock, for example, of interest, and noting the change in color when it occurs. It would be desirable to be able to detect, continuous, automatic indications of the ongoing behavior of a variable element trend.

Figure 5A:
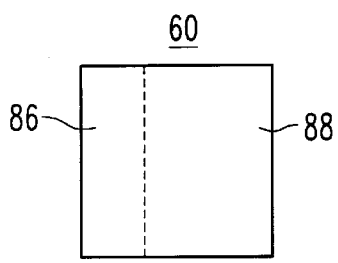
FIGS. 5A, B and C are schematic illustrations of variations on an enhancement to this invention.
Figure 5B:
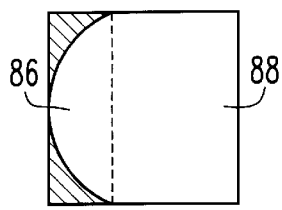
Figure 5C:
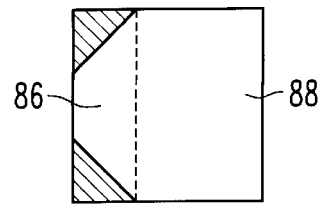

A further enhanced embodiment of this invention achieves the foregoing objective by splitting each box/block 60, for example, vertically as illustrated in FIG. 5, into two typically unequal areas, one showing the current color indication of the trend as described in the basic invention and the second showing the color of the most recent different indication of the trend for that particular market component. For example, in the split field 60 illustrated in FIG. 5A the left hand portion 86 would show the prior color coded trend information while the right hand portion 88 would contain the current color coded trend information. If the fractional deviation value has not changed significantly since initialization of the display following the specification of reference conditions, the entire box/block will be a uniform color. If the color has changed in the interval since the specification of reference conditions the current indication appears in the preferably larger right hand part of the box/block 88 and the prior color indication appears in the preferably smaller left hand part of the box/block 86 as shown in FIG. 5. In order to avoid visual confusion it is necessary that a strong boundary differentiation be established for each box/block from the surrounding boxes/blocks 60. It should be appreciated that other geometric arrangements of the two components 86 and 88 of the field 60 are possible and in some instances desirable. For example, the geometric arrangements illustrated in FIGS. 5B and 5C can be employed to set off each box/block 60 from the adjacent fields.

Figure 6:
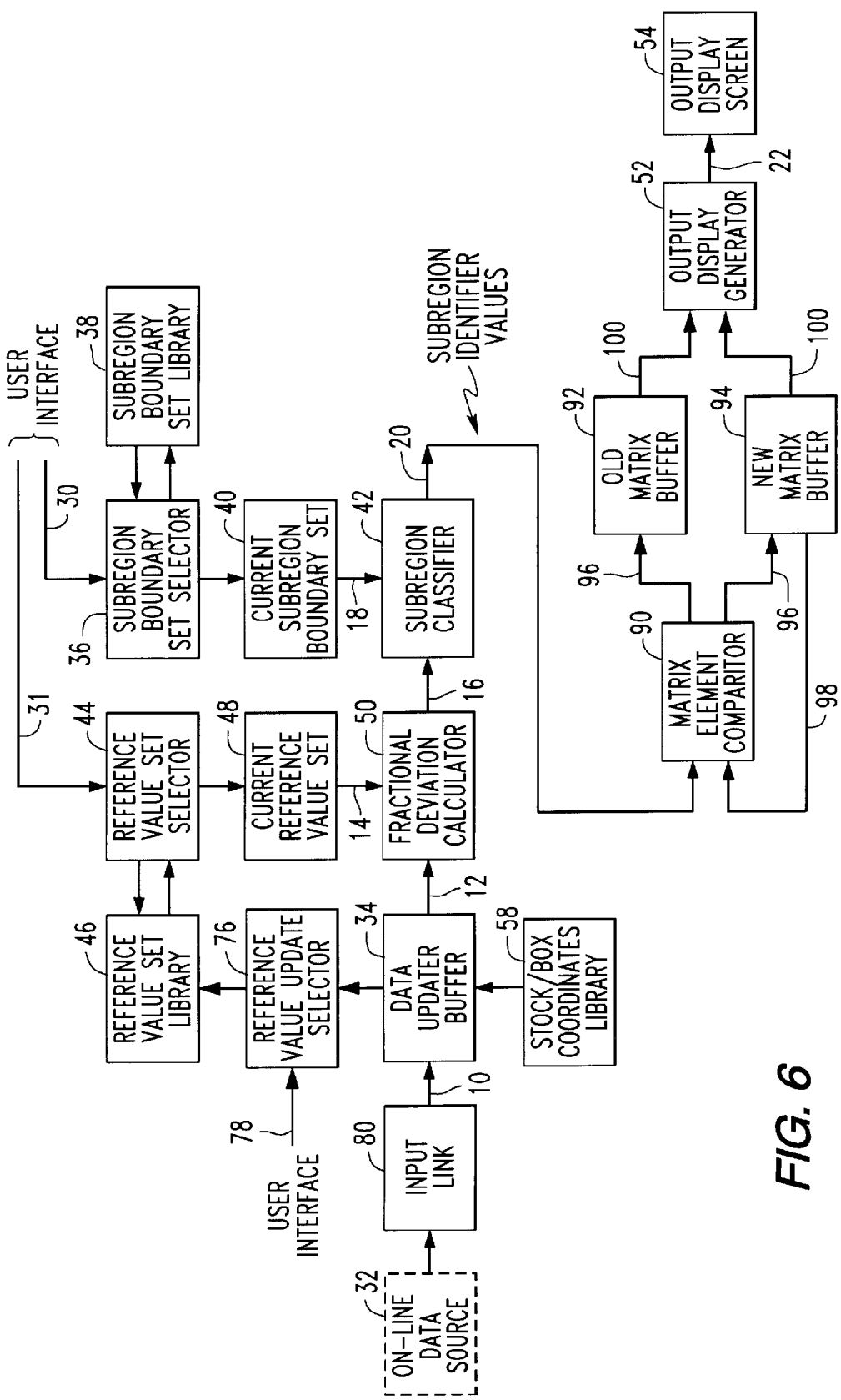
FIG. 6 is a block diagram of a modification to the system of FIG. 2 for generating a display incorporating the enhancement of this invention illustrated in FIG. 5.

FIG. 6 illustrates in block diagram form a circuit to implement the further improvement to display trends within a field 60. The corresponding elements which had been previously illustrated in FIGS. 2 are shown with like reference characters for comparison. The circuit utilizes two matrix buffers, referred to as the "old" matrix buffer 92 and the "new" matrix buffer 94. Initially the fractional deviation values for the first time step, after the reference value is established, are converted to subregion identifiers and the respective subregion identifier values 20 are stored as corresponding elements in both the "old" and the "new" matrix buffers 92 and 94, respectively. This operation is performed in the matrix element comparitor 90 shown in FIG. 6. The contents of the two matrix buffers are passed to the display generator 52 which generates the graphical display using the integer values in the "old" matrix buffer 92 to set the pixel colors in the left hand portion 86 of the corresponding boxes/blocks 60 and the integer values in the "new" matrix buffer 94 to set the pixel colors in the right portion 88 of the corresponding boxes/blocks. Thereafter, at each update time step the fractional deviation calculator 50 recalculates each fractional deviation value, which is converted into an integer subregion identifier value in the subregion classifier 42. Then the current subregion identifier value is compared in the matrix element comparitor 90 to the corresponding value 98 that was determined in the most recent prior update cycle. At this point, the most recent prior value will still be stored as the corresponding element in the "new" matrix buffer 94. If the most recently determined subregion identifier is the same as the corresponding immediately prior value, the system proceeds to update the next fractional deviation value in the update cycle. If the most recently determined subregion identifier value is not the same as the corresponding immediately prior value, the immediately prior value 98 is stored in the appropriate location in the "old" matrix buffer 92 corresponding to the field 86 shown in FIGS. 5A, B and C. The most recently calculated value 20 in that case is stored in the corresponding location in the "new" matrix buffer 94 corresponding to the subfield 88, and the system then proceeds to the updating of the next fractional deviation value in the update sequence. When the full set of fractional deviation values has been updated and the corresponding elements of the "old" and "new" matrix buffers 92 and 94 have been adjusted as required, the graphical display is generated as described above in connection with initialization.

In an exemplary application of this improvement, consider the color pattern in a particular box/block 60 corresponding to an arbitrary selected stock. If the right hand portion 88 of the box is any "greenish" color and the left hand portion 86 is:

a. yellow or a lighter green, the current stock price is above the reference value and rising; a buy situation;

b. the same shade of green as the right portion, the stock price is above the reference value and holding nominally steady; probably a buy situation; or c. a darker shade of green, the stock price is above the reference value, but decreasing; a hold situation.

If the right hand portion of the box/block 60 is yellow, the stock price is close to its reference value; a hold situation.

If the right hand portion 88 of the box/block is any "orangish" color and the left hand portion 86 is:

a. a darker shade of orange, the stock price is below its reference value, but rising; a hold situation;

b. the same shade of orange as the right hand portion, the stock price is below its reference value and holding nominally steady; probably a sell situation; or c. yellow or a lighter shade of orange, the stock is below its reference value and falling; a sell situation.

When the enhancement just described is incorporated in the invention it is highly desirable that the rigid boundaries of separation between the subregions defined by Table 1 be replaced by deadbands in order to suppress possible flutter in the subregion identifier values at successive time steps, as is well known in the art.

Thus this invention provides a wealth of information about financial markets to an investor in a manner that can be easily absorbed and readily understood. Furthermore, the display highlights market trends and makes future predictions easier.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breath of the appended claims and any and all equivalents thereof.

What is claimed is:

1. A display for identifying trends in a financial market having a number of analogous components with at least two corresponding characteristics and a corresponding variable element comprising:

a plurality of complementary geometrically shaped fields, each representative of one of the components, displayed side by side in a graphical array bordered on two sides by a first and second intersecting axis, the first axis representative of a first characteristic of the components and the second axis representative of a second characteristic of the components, the respective fields being positioned in an area between the axes in order of priority, to be conveyed to a display observer, of the impact each characteristic for each component has on a process common to each of the components; and means for independently varying a visual pattern within each field according to a common code which incrementally changes between a first pattern representative of a first extreme, a second pattern representative of a second extreme and an intermediate pattern representative of a reference value which is a monitored value of the variable element associated with the corresponding component, at a first common point in time for all fields, and the first and second extremes are predetermined numerical deviations from the reference value, wherein the pattern displayed in each field corresponds to the deviation of the variable element from the variable element's corresponding reference value for the respective component at the last point in time that the variable element was monitored.

2. The display of claim 1 wherein the geometric shaped fields are rectangles.

3. The display of claim 1 wherein the measured variable for each field is updated periodically at the same point in time.

4. The display of claim 3 including means for updating each field automatically.

5. The display of claim 3 wherein the reference value for each component is updated periodically at the same point in time.

6. The display of claim 1 including means for smoothing the transition in pattern between adjacent fields.

7. The display of claim 6 including a user input for selecting between the display of the output of the smoothing means or the raw data.

8. The display of claim 7 wherein the user input disables the smoothing means when display of the raw data is selected.

9. The display of claim 1 including means for presenting alphabetic information within a field of a given component that is relevant to that component.

10. The display of claim 9 wherein the alphabetic information identifies the component.

11. The display of claim 9 wherein alphabetic and/or numerical information concerning the component is presented upon command.

12. The display of claim 1 wherein the pattern within each field is a graphical pattern.

13. The display of claim 1 wherein the pattern in each field is a color with a first color assigned to the first extreme and a second color assigned to the second extreme and an intermediate color assigned to the reference value.

14. The display of claim 13 wherein the pattern in each field is a combination of the color and a graphical pattern.

15. The display of claim 13 where the intermediate color is a primary color and the colors assigned to the first and second extremes are blended colors including the primary color.

16. The display of claim 1 wherein the components that relate to one another are displayed together as a sector.

17. The display of claim 16 wherein more than one sector is displayed at a time.

18. The display of claim 1 wherein the components whose first and second characteristics are to be perceived as having the greatest impact on the process are situated in the upper left hand corner of the display.

19. The display of claim 1 wherein one of the predetermined numerical deviations represented by the first and second extremes is positive and the other deviation is negative with regard to the reference value and both of the predetermined deviations are substantially of equal value.

20. The display of claim 19 wherein the amount of the deviations are revised periodically to take into account the extent of the swings of the variable over a given period.

21. The display of claim 20 including means for revising the deviations automatically.

22. The display of claim 1 including means for storing the output of the display for later retrieval.

23. The display of claim 1 wherein the display shows the date and time of the last update of the reference value.

24. The display of claim 23 wherein the display further includes a color mapping legend.

25. The display of claim 1 wherein each of the geometrically shaped fields is subdivided into at least two subfields wherein the pattern displayed in a first subfield corresponds to the deviation of the variable element from its corresponding reference value for the respective component at the last point in time that the variable element was monitored and the pattern displayed in a second subfield corresponds to the previous deviation from the same reference value monitored for that component.

26. The display of claim 25 wherein each field is divided vertically to make up its subfields.

27. The display of claim 25 wherein the area of the subfields for each geometric shaped field is unequal where the field having the smaller area is representative of the prior measured deviation and the subfield having the larger area is representative of the last measured deviation for that component.

28. The display of claim 25 wherein if no monitored previous deviation from the same reference value exists, the first and second subfields display the same pattern.

29. The display of claim 1 wherein if a stock represented in the display is withdrawn from trading, the corresponding field displays a unique pattern distinctly representative of that event.

30. A display for identifying trends in a commercial market having a plurality of sectors each including a plurality of components, comprising:

a plurality of complimentary geometrically shaped fields, each representative of one of the components, with the fields representative of components of a given sector displayed side by side in a graphical array bordered on two sides by a first and second intersecting axis, the first axis representative of a first characteristic of the components and the second axis representative of a second characteristic of the components, the respective fields being positioned in an area between the axes in order of priority, to be conveyed to a display observer, of the impact each characteristic for each component has on the market; and means for independently varying the color of each field according to a common color code which incrementally changes between a first color representative of a first extreme, a second color representative of a second extreme and an intermediate color representative of a reference value which is a monitored value of a selected variable associated with each component, at a common first preselected point in time for all fields, and the first and second extremes are predetermined numerical deviations from the reference value, wherein the color displayed in each field corresponds to the deviation of the selected variable from the variable element's corresponding reference value for the respective component at the last point in time that the selected variable was monitored.

31. The display of claim 30 including a plurality of such displays each corresponding to a separate sector of the market.

32. The display of claim 30 wherein the market is a stock market and the components are individual stocks.

33. The display of claim 32 wherein the sectors are related industries.

34. The display of claim 32 wherein the sectors are regions of the world.

35. The display of claim 30 wherein the market is the currency market and the components are the currencies of individual nations.

36. The display of claim 35 wherein the sectors are regions of the world.

37. The display of claim 32 wherein the first characteristic is market share and the second characteristic is capitalization.

38. The display of claim 32 wherein the first characteristic is sensitivity to internal sector/market activity and the second characteristic is sensitivity to external activity.

39. The display of claim 32 wherein the first characteristic is sensitivity to national activity and the second characteristic is sensitivity to international activity.

40. The display of claim 30 wherein each geometrically shaped field is divided into at least two smaller subfields, a first subfield displaying the color that corresponds to the deviation of the selected variable from its corresponding reference value for the respective component at the last point in time that the selected variable was monitored and a second subfield displays the color corresponding to the last previous measured value for the deviation of the selected variable from the same corresponding reference value that was different from the last measured deviation of the selected variable, or the same color as the first subfield if no such previous measured different deviation was monitored.

41. The display of claim 40 wherein the fields are divided vertically to obtain the first and second subfields.

42. The display of claim 40 wherein the first and second subfields are of an unequal area with the larger area devoted to the first subfield.

43. The display of claim 30 wherein each geometrically shaped field displays the trend of the selected variable associated with the corresponding component over a selected period of time.

44. A display for identifying trends in a commercial market having a number of analogous components with at least one corresponding, variable element comprising:

a plurality of complimentary geometrically shaped fields, each representative of the corresponding, variable element of one of the components, displayed side by side in a graphical array; and means for independently varying a visual pattern within each field according to a common code which incrementally changes between a first pattern representative of a first extreme, a second pattern representative of a second extreme and an intermediate pattern representative of a reference value which is the value of the corresponding variable element associated with each component, at a first common point in time for all fields, and the first and second extremes are predetermined numerical deviations from the reference value, wherein the pattern displayed in each field corresponds to the deviation of the variable element from the variable element's corresponding reference value for the respective component at the last point in time that the variable element was monitored.

* * * * *